(12) United States Patent
Asif et al.

(10) Patent No.: US 10,970,855 B1
(45) Date of Patent: Apr. 6, 2021

(54) MEMORY-EFFICIENT VIDEO TRACKING IN REAL-TIME USING DIRECTION VECTORS

(71) Applicant: International Business Machines Corporation, Armonk, NY (US)

(72) Inventors: Umar Asif, Melbourne (AU); Jianbin Tang, Doncaster East (AU); Subhrajit Roy, Melbourne (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/809,681

(22) Filed: Mar. 5, 2020

(51) Int. Cl.
*G06T 7/246* (2017.01)
*G06T 7/73* (2017.01)

(52) U.S. Cl.
CPC ............... *G06T 7/248* (2017.01); *G06T 7/73* (2017.01); *G06T 2207/10016* (2013.01)

(58) Field of Classification Search
CPC .......... G06T 7/20; G06T 7/246; G06T 7/248; G06T 7/269; G06T 7/70; G06T 7/73; G06T 7/74; G06T 2207/30241; G06F 16/21; G06F 16/211; G06F 16/2237
See application file for complete search history.

(56) References Cited

U.S. PATENT DOCUMENTS

| | | | |
|---|---|---|---|
| 5,557,684 A | 9/1996 | Wang et al. | 382/107 |
| 5,933,535 A | 8/1999 | Lee et al. | 382/243 |
| 6,026,182 A | 2/2000 | Lee et al. | 382/173 |
| 6,075,875 A | 6/2000 | Gu | 382/107 |
| 6,711,209 B1 | 3/2004 | Lainema et al. | 375/240 |
| 6,711,278 B1 | 3/2004 | Gu et al. | 382/103 |
| 6,944,227 B1 | 9/2005 | Bober | 375/240.22 |
| 7,433,497 B2 | 10/2008 | Chen | 382/107 |
| 7,817,822 B2 | 10/2010 | Sun et al. | 382/103 |
| 9,082,018 B1 * | 7/2015 | Laska et al. | G06K 9/00765 |
| 2003/0126622 A1 | 7/2003 | Cohen et al. | 725/135 |

* cited by examiner

*Primary Examiner* — Andrew W Johns
(74) *Attorney, Agent, or Firm* — Cantor Colburn LLP; Joseph Petrokaitis

(57) ABSTRACT

Provided are embodiments for a computer-implemented method. The method includes receiving a sequence of image data, transforming objects in each frame of the sequence of the image data into direction vectors, and clustering the direction vectors based at least in part on features of the objects. The method also includes mapping the direction vectors for the objects in each frame into a position-orientation data structure, and performing tracking using the mapped direction vectors in the position-orientation data structure. Also provided are embodiments of a computer program product and a system for performing object tracking.

20 Claims, 8 Drawing Sheets

MEMORY-EFFICIENT VIDEO TRACKING IN REAL-TIME USING DIRECTION VECTORS

BACKGROUND

The present invention generally relates to computer vision systems, and more specifically, to real-time tracking of multiple object entities under moving camera scenarios.

Computer vision is a field of digital processing that includes automatic data extraction and analysis of images or video to obtain an understanding of the information provided in the digital data. In some architectures, artificial intelligence (AI) is used to extract information from the images, where the AI is used to build models that are used for a specific task. The data used to train the models can originate from different sources such as video sequences, views from multiple cameras, or multi-dimensional data such as that from a scanner. The AI models can be used for a variety of applications including video/object tracking. Other applications can include 3D modeling, scene reconstruction, etc.

SUMMARY

Embodiments of the present invention are directed to a computer-implemented method for performing memory-efficient video tracking in real-time using direction vectors. A non-limiting example of the computer-implemented method includes receiving, by a processing engine, a sequence of image data; transforming objects in each frame of the sequence of the image data into direction vectors; and clustering the direction vectors based at least in part on features of the objects. The computer-implemented method also includes mapping the direction vectors for the objects in each frame into a position-orientation data structure; and performing tracking using the mapped direction vectors in the position-orientation data structure.

Embodiments of the present invention are directed to a system for performing memory-efficient video tracking in real-time using direction vectors. A non-limiting example of the system includes one or more processors; and at least one memory, the memory including instructions that, upon execution by at least one of the one or more processors, cause the system to perform a method for performing memory-efficient tracking. The method includes receiving a sequence of image data; transforming objects in each frame of the sequence of the image data into direction vectors; and clustering the direction vectors based at least in part on features of the objects. The method also includes mapping the direction vectors for the objects in each frame into a position-orientation data structure; and performing tracking using the mapped direction vectors in the position-orientation data structure.

Embodiments of the invention are directed to a computer program product for performing memory-efficient video tracking in real-time using direction vectors, the computer program product comprising a computer-readable storage medium having program instructions embodied therewith. The program instructions are executable by a processor to cause the processor to perform a method. A non-limiting example of the method includes receiving a sequence of image data; transforming objects in each frame of the sequence of the image data into direction vectors; and clustering the direction vectors based at least in part on features of the objects. The method also includes mapping the direction vectors for the objects in each frame into a position-orientation data structure; and performing tracking using the mapped direction vectors in the position-orientation data structure.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
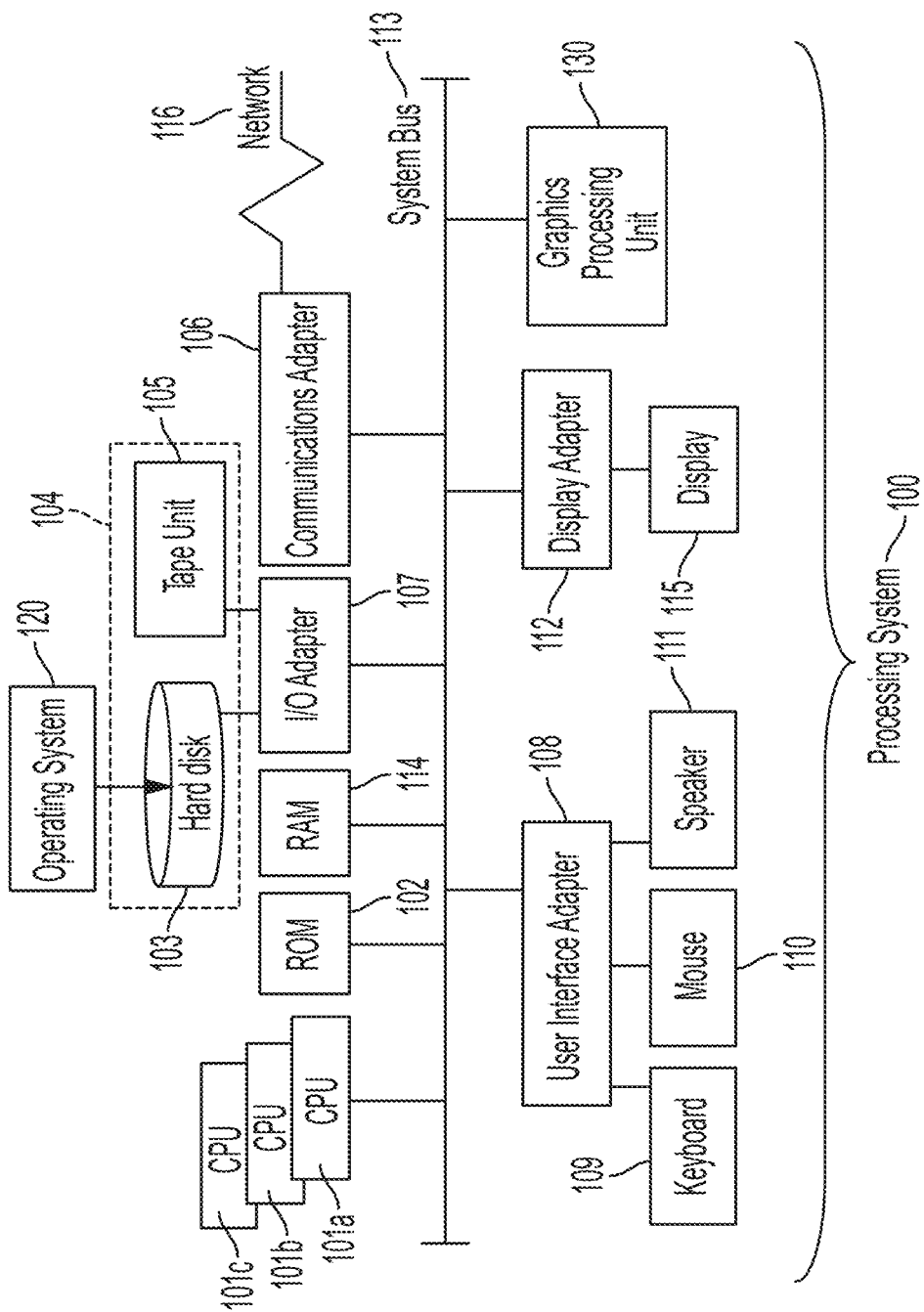
FIG. 1 is a block diagram illustrating one example of a processing system for practice of the teachings herein.

The diagrams depicted herein are illustrative. There can be many variations to the diagram or the operations described therein without departing from the spirit of the invention. For instance, the actions can be performed in a differing order or actions can be added, deleted or modified. Also, the term "coupled", and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, image processing systems are used to perform a variety of tasks such as enhancing video, object tracking, surveillance, etc. The obtained images include pixel data for each pixel of a frame. The intensity information for each pixel can be recorded. In addition, the color information associated with each pixel can be recorded. As the resolution of the images increase, more and more pixel data must be processed and stored. A balance between the speed of data processing and the accuracy of the object tracking must be considered as different tasks are performed.

Video analysis at interactive frame rates is very difficult due to loss in attention, the complexity of the scene, occlusions, background clutter, imperfections in the video data, and high memory requirements due to large machine learning models. Conventional offline methods are very slow, have large memory requirements, and require human intervention during the labeling process making the entire process time consuming, tedious and error-prone. Also, conventional AI-based models are very processing intensive, require heavy graphic processing unit (GPU) computations, and require large memories which makes interactive frame rates unachievable.

Turning now to an overview of the aspects of the invention, one or more embodiments of the invention address the above-described shortcomings of the prior art by providing a technique to efficiently store image data and perform tracking of multiple objects at interactive frame rates. The techniques process a sequence of images, where the objects of each image are transformed into direction vectors. The direction vectors are clustered and mapped into a data structure which increases the efficiency in data storage and retrieval operations. As subsequent frames are processed each of the objects are compared with other objects that are stored in the data structure. If a corresponding object is located in the data structure, the data is updated and tracking of the object is performed. In addition, missing and occluded objects in the images are managed by performing a look-up operation in the memory-efficient data structure to recover the missing image data.

The above-described aspects of the invention address the shortcomings of the prior art by utilizing a memory-efficient data structure that reduces the processing complexity. The arrangement of the memory-efficient data structure organizes clusters of data together and limits lookup operations by only searching the limited number of storage elements instead of processing each and every pixel of the image for each frame. By limiting the amount of data that is processed, the more efficient the system will operate. Because the efficiency is increased, the delay in processing is improved which allows for processing of the image data and tracking at interactive frame rates.

Turning now to a more detailed description of aspects of the present invention, FIG. 1 depicts a processing system 100 for implementing the teachings herein according to embodiments of the invention. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read-only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
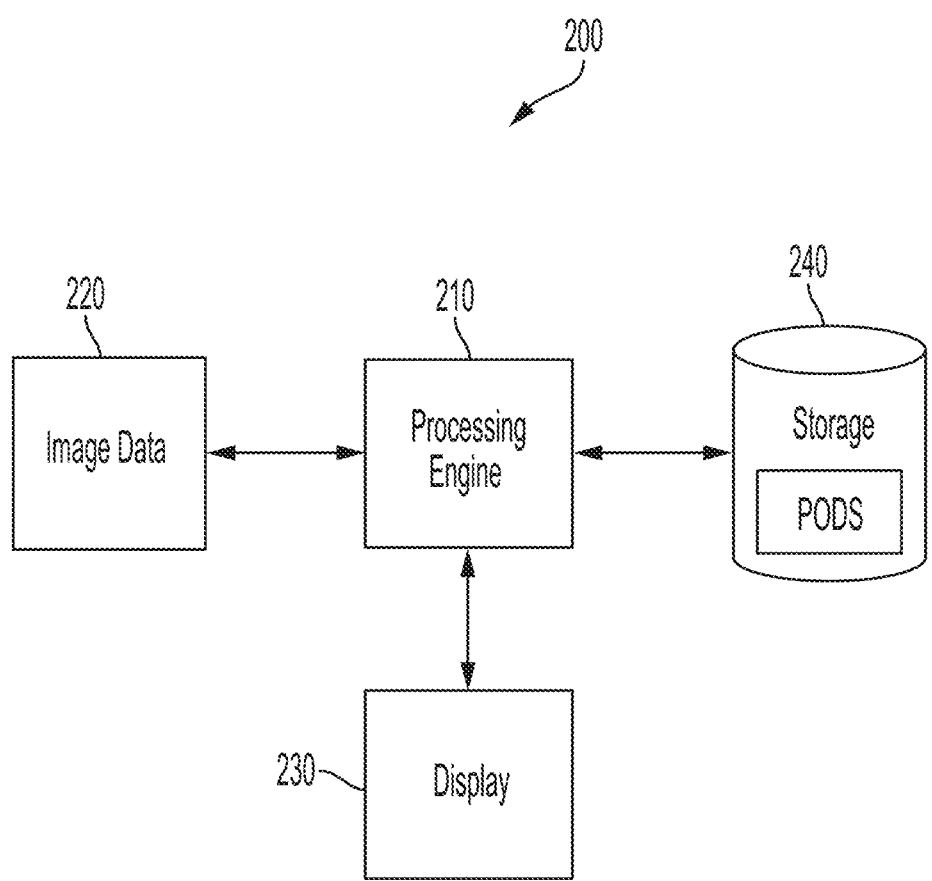
FIG. 2 depicts a system for performing memory-efficient object tracking in accordance with one or more embodiments of the invention.

Now referring to FIG. 2, a system 200 for performing memory-efficient tracking in accordance with one or more embodiments is shown. It should be understood the elements of FIG. 1 can be incorporated into the system 200. In addition, other system architectures can be implemented and are not intended to be limited by that shown in FIGS. 1 and 2. The system 200 includes a processing engine 210. The processing engine 210 is configured to process the input data and transform the image data into direction vectors. The processing engine 210 is further configured to group or cluster the direction vectors that have a similar position and orientation in the frame. The direction vectors can represent an object in the frame of an image. The direction vectors are mapped to a location in the data structure based on the position and orientation of the object represented by the direction vectors. This allows the direction vectors having the same or similar orientation and position to be stored in the same or similar location within the memory-efficient structure. The arrangement of the data structure, discussed further with reference to FIG. 3 below, allows for efficient storage and look-up operations.

As subsequent frames of the sequence are processed, the pixels of the frames are transformed into direction vectors. These direction vectors are clustered and mapped to a location or bin in the data structure based on their position and orientation.

The direction vectors representing an object in the current frame are compared to the direction's vectors for the object in a previous frame. Direction vectors having a similar position and orientation can be stored in the same location or bin in the data structure. These direction vectors can be used to efficiently track an object over a sequence of frames or images. Because the data corresponding to the direction vectors of the previous frames are maintained, it is used as a reference frame and compared to the data of the current frame for missing or occluded object detection. If the direction vectors of the current frame and previous frames are within a threshold value of each other, they are determined to represent the same object, and the object can be tracked over the sequence of frames. The threshold values can be configured to optimize the results for tracking the object.

The direction vectors that are stored in the data structure can be updated, for example, by averaging the position and orientation information for the current and previous frames to track the object through the sequence of frames. The tracking information for the object can be re-projected on a display for a user. It should be understood that other techniques may be used for updating the direction vectors.

Also, data from multiple sources, i.e. cameras, or viewpoints can be processed by the processing engine 210 and registered into a global reference frame. Additionally, the data can be mapped into the data structure based on the position and orientation information. In one or more embodiments of the invention, temporal information and an index for each frame can be stored to detect the position in each frame of the sequence. The temporal information and frame index information can be used to perform error-correction or to locate various missing objects/regions of the frame.

Figure 3:
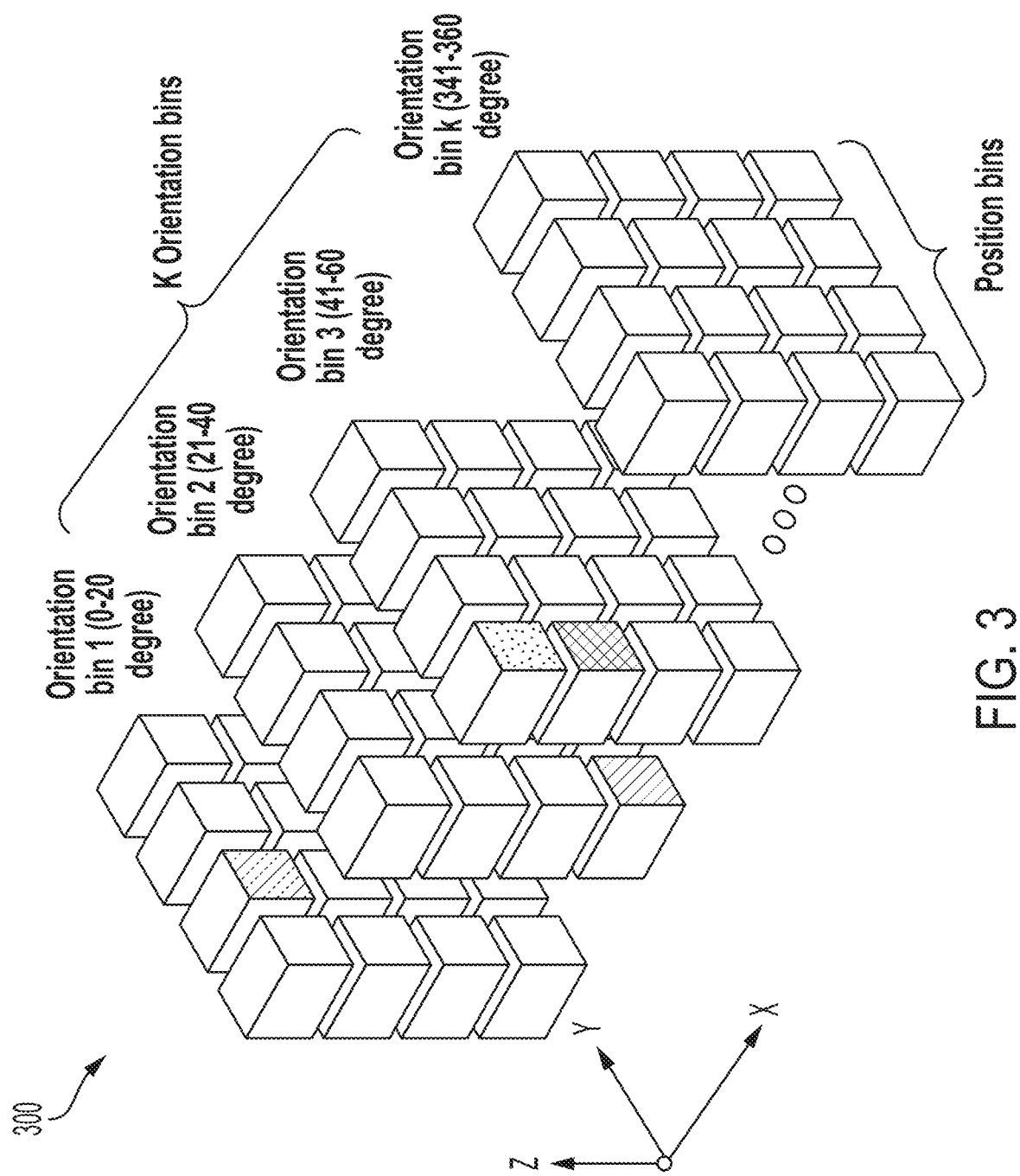
FIG. 3 depicts a memory-efficient data structure in accordance with one or more embodiments of the invention.

FIG. 3 depicts an example position-orientation data structure 300 (PODS) for performing memory-efficient tracking in accordance with one or more embodiments of the invention. For illustration purposes structure is displayed in a 3D data structure. The data structure 300 includes a plurality of bins, represented by the blocks, that are arranged to store the data obtained from the processing engine 210. The data can include but are not limited to the position information, orientation information, and/or feature information of the object(s). The data stored by the bins in the PODS is configurable. The bins can store data from a single direction vector to multiple direction vectors depending on the amount of information to be tracked in the video. In one or more embodiments of the invention, the direction vectors can store a multitude of information depending upon the available memory specifications or application requirements. In some embodiments of the invention, the direction vectors can store information such as: its (x, y) position in 2-dimensional image space, 3-dimensional coordinates (x, y, z) in 3D Cartesian space, surface orientation information (e.g., angle in degrees with respect to a tangent to the surface), a machine learning feature (which can be generated by extracting an image patch around the direction vector's position, feeding the patch to a pre-trained convolutional neural network, and finally storing the outputs from the convolutional or fully connected layers of the network), etc.

In one or more embodiments of the invention, the bins in the x-direction are arranged based on the orientation of an object. In this non-limiting example, the orientation bin 1 stores direction vectors within the range of 0-20 degrees, orientation bin 2 stores direction vectors within the range of 21-40 degrees, and orientation bin 3 stores direction vectors within the range of 41-60 degrees . . . orientation bin K stores direction vectors within the range of 341-360 degrees. Although it is shown that each bin is associated with a range of 20 degrees, it should be understood that the range can be a configurable range and may be selected based upon the desired application. For example, the bins can be configured with a smaller range such as 5, 10, 15 degrees, etc. or the bins can be configured with a larger range such as 30, 40, 60 degrees, etc.

The bins in the y-direction and z-direction are arranged based on the position of the object within the frame. In the arrangement shown in FIG. 3, the position represented by the rows and columns for the bins is divided into four rows and four columns. It should be understood the position bins can be arranged in a different manner having a different number of rows and columns. The direction vectors are stored in a particular bin location based on the orientation information and the position information of the object within each frame. An example is discussed below with reference to FIG. 4.

Figure 4:
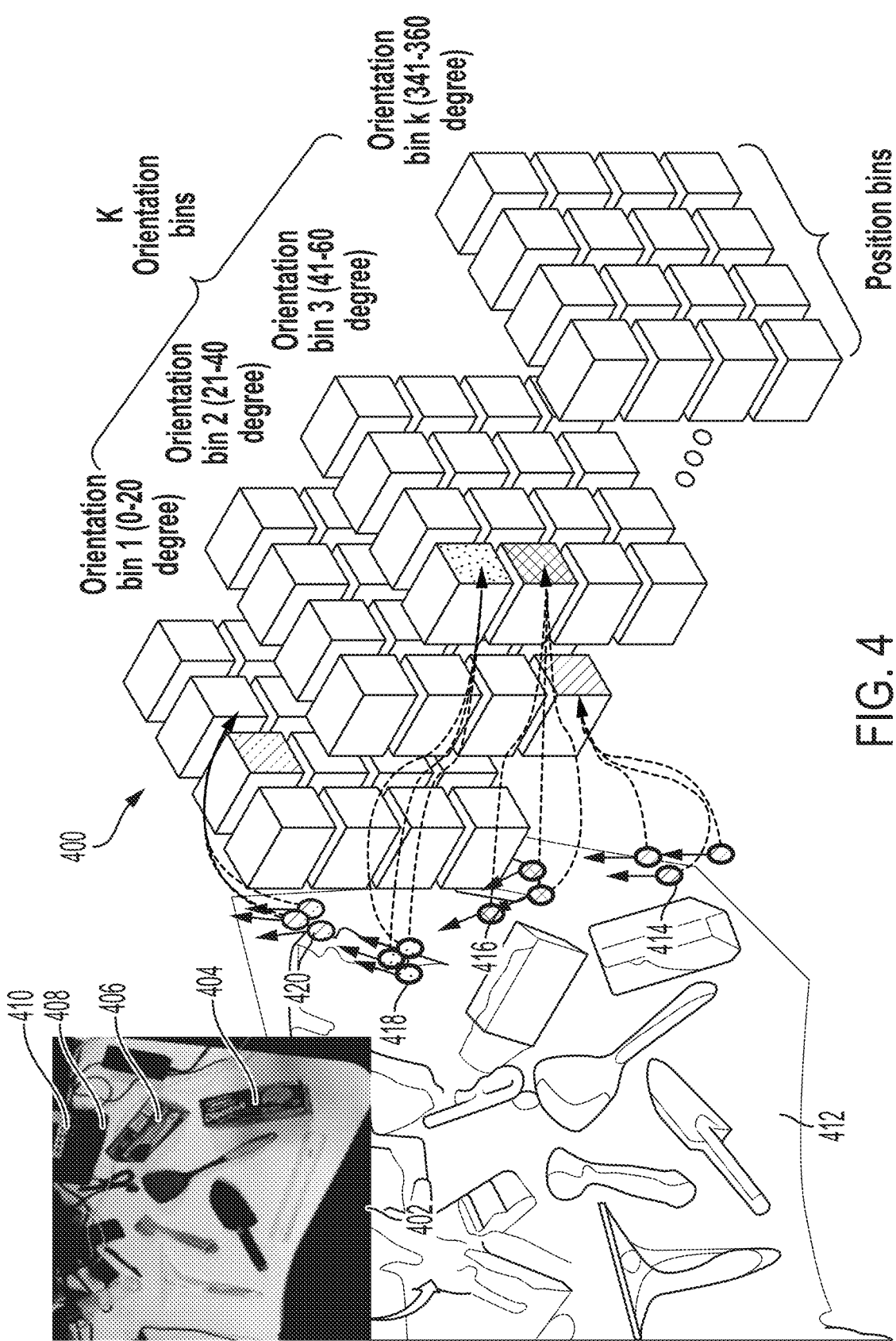
FIG. 4 depicts the processing of a single frame in accordance with one or more embodiments of the invention.

Now referring to FIG. 4 depicts example image data 402 that is received and processed by the processing engine 210. The image data 402 includes a plurality of objects. For example, the image data 402 includes a first object 404 which is a box, a second object 406 which is also a box, a third object 408 is a phone, and a fourth object 410 is a display portion of the phone. The image data 402 is processed by the processing engine 210 where the pixels of the image are converted to direction vectors.

As shown in the direction vector map 412, the image data 412 is converted to direction vectors, where direction vectors having a similar position and orientation are grouped or clustered together. The direction vector(s) can represent an object in the image. For example, direction vectors 414 representing the first object 404 are clustered together. The direction vectors 416 representing the second object 406 are clustered together. The direction vectors 418 representing the third object 408 are clustered together. Finally, the direction vectors 420 representing the fourth object 410 are clustered together. Subsequently, each of the clusters of direction vectors are mapped to a location in a memory-efficient data structure, similar to the data structure 300 shown in FIG. 3.

Direction vectors that have similar characteristics are clustered together. For example, the direction vectors that have the small inter-sample distances and similar orientation are assigned to the same bin. The cluster of direction vectors 414 are mapped to a bin in orientation bin 2 and the first row, first column corresponding to the position. The cluster of direction vectors 416 and 418 are mapped to bins in orientation bin 3, where direction vectors 416 are mapped to the third row, first column and direction vectors 418 are mapped to the fourth row, first column based on the corresponding position in the frame. The cluster of direction vectors 420 is mapped to orientation bin 1 and the fourth row, second column. As subsequent frames are processed the direction vectors are also stored in the corresponding bins of the data structure.

Figure 5:
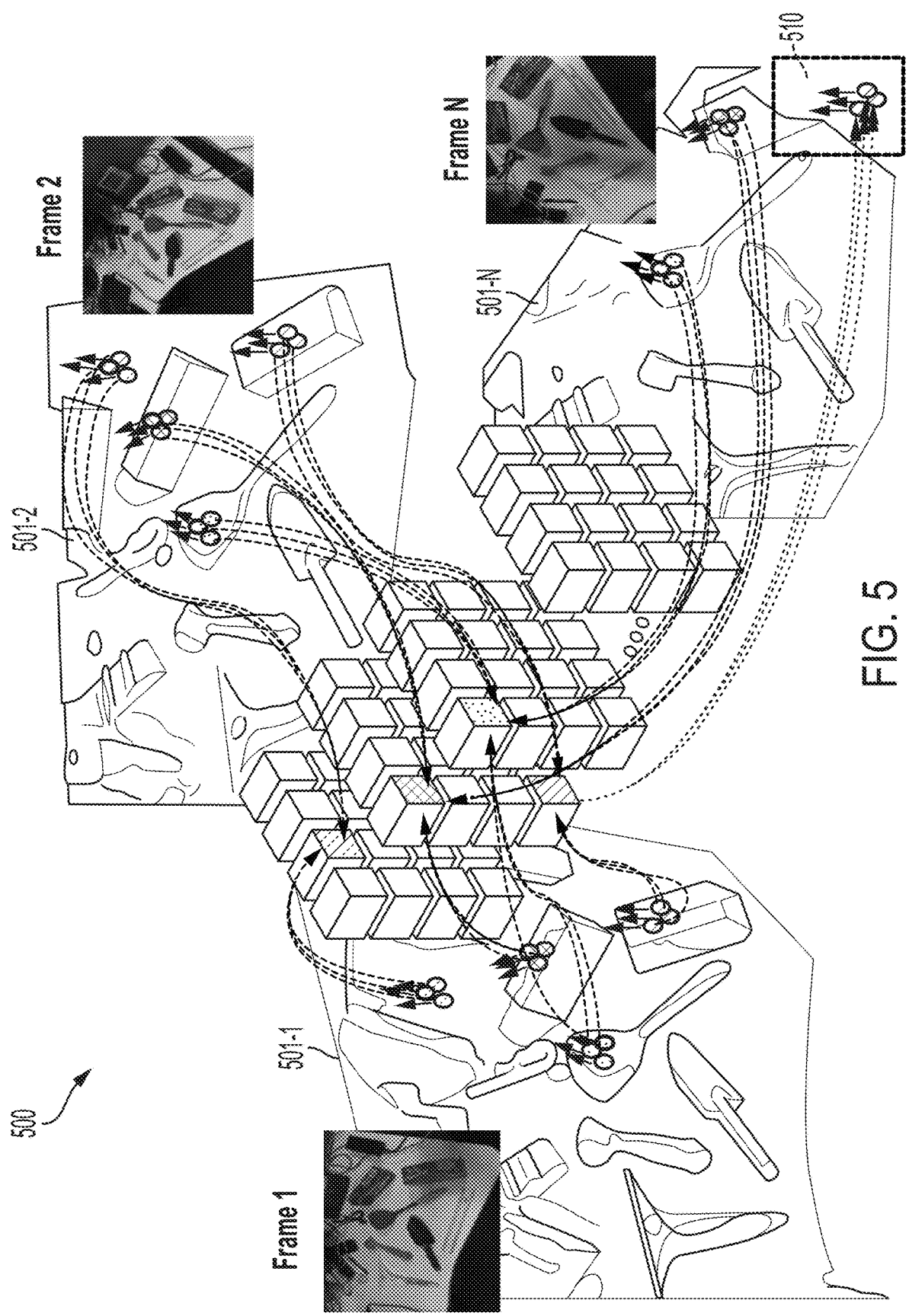
FIG. 5 depicts the processing of multiple frames of a sequence in accordance with one or more embodiments of the invention.

Now with reference to FIG. 5, a sequence of frames (Frame 1, Frame 2 . . . Frame N) are received and processed by the processing engine 210. The pixel data for each frame is transformed into direction vectors. As shown in FIG. 5, the additional frames are processed to obtain the direction vector maps 501-1, 501-2, 501-N corresponding to Frame 1, Frame 2 . . . Frame N, respectively. Then, the direction vectors are mapped into the data structure. In one or more embodiments of the invention, Frame 2 and Frame N depict different viewpoints of the objects. As shown, the direction vectors of the direction vector map 501-2 and 501-N are mapped to the same location in the data structure as the direction vectors of the direction vector map 501-1. This occurs because direction vectors of the same objects will have a small inter-frame distance and/or orientation changes between frames. Therefore, by tracking the direction vectors, instead of each individual pixel of the frame can reduce the processing complexity of the for real-time object tracking.

In one or more embodiments of the invention, objects that are missing or occluded in a frame can be located in the data structure 300 and retrieved. As the direction vectors of Frame N are mapped into the data structure, the current direction vectors are compared to the previous direction vectors. The processing engine may determine the direction vectors for an object are missing based on the comparison. Because the missing object is in a general position of the image frame the lookup operation can efficiently identify a portion of the data structure to analyze. Conventional techniques generally do not store the historical data and if so, the stored data is in the form of pixel data and would require intense processing to locate such the missing object. In addition, the complex processing would increase the delay so that real-time tracking of the object cannot be achieved. However, the techniques described herein can achieve real-time object tracking by using the PODS data structure. In this example, the direction vectors 510 shown in Frame N are retrieved from the data structure and used to provide seamless tracking for a user.

Figure 6:
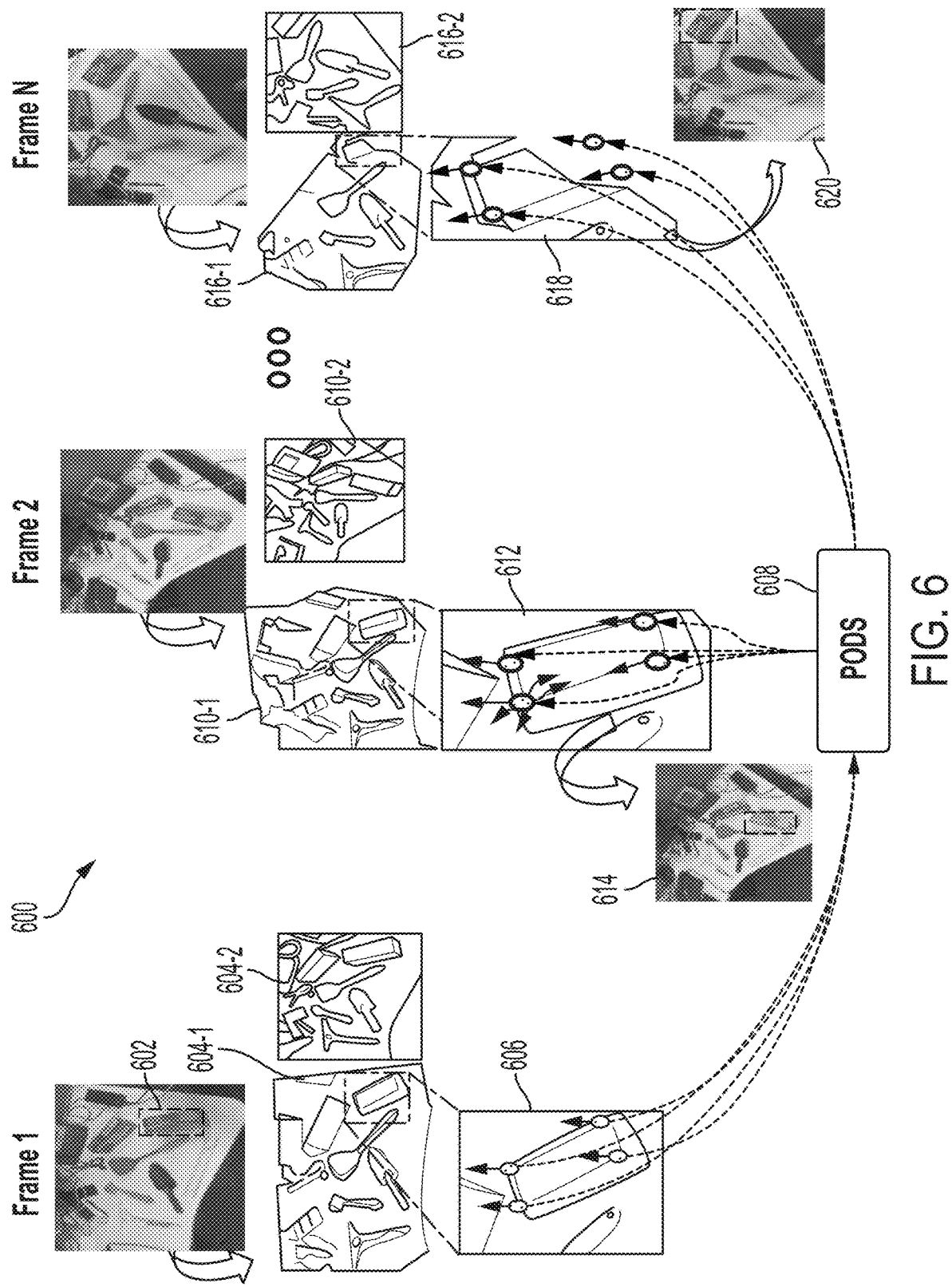
FIG. 6 depicts the tracking of multiple objects in a sequence of frames in accordance with one or more embodiments of the invention.

Now referring to FIG. 6, the processing engine 210 is configured to perform tracking of multiple objects while a camera is in motion in accordance with one or more embodiments. Frame 1 includes a plurality of objects. In this non-limiting example, object 602 is selected for tracking. After the selection, Frame 1 is processed, and the objects are transformed into direction vectors as shown in the direction vector map 604-1. The direction vectors are mapped into the data structure based on their feature values (orientation and position). These direction vectors represent the 3D locations of a region in the frame. The orientation of the objects is shown in the orientation map 604-2. The orientation map represents the orientation information of each object of the image. A closer view of the object of interest is shown in the window 606 and is represented by four direction vectors that are to be stored in the data structure 608.

Frame 2 is received and processed to transform the objects into direction vectors as shown in the direction vector map 610-1. As shown, the viewpoint of Frame 2 is different than Frame 1 as shown in the orientation map 610-2. This can be caused by the camera providing the input being moved or input from another camera that is input into the system. Another view of the object 602 being tracked is shown in the window 612 and the display is updated to track the object as shown in the window 614.

Frame N depicts another viewpoint that is processed to obtain the direction vector map 616-1 and the orientation map 616-2. Although portions of the image data are missing, the information is obtained from the data structure 608 and tracking is maintained as shown in the windows 618 and 620.

In one or more embodiments of the invention, image data from multiple cameras can be registered to a global frame of reference. Each of the images can be aligned to the global frame of reference using the orientation maps to determine the inter-frame differences. Multiple sources of information can be used to increase the data that is used to improve tracking. The data which are gathered from different viewpoints provide additional information to perform accurate tracking.

Figure 7:
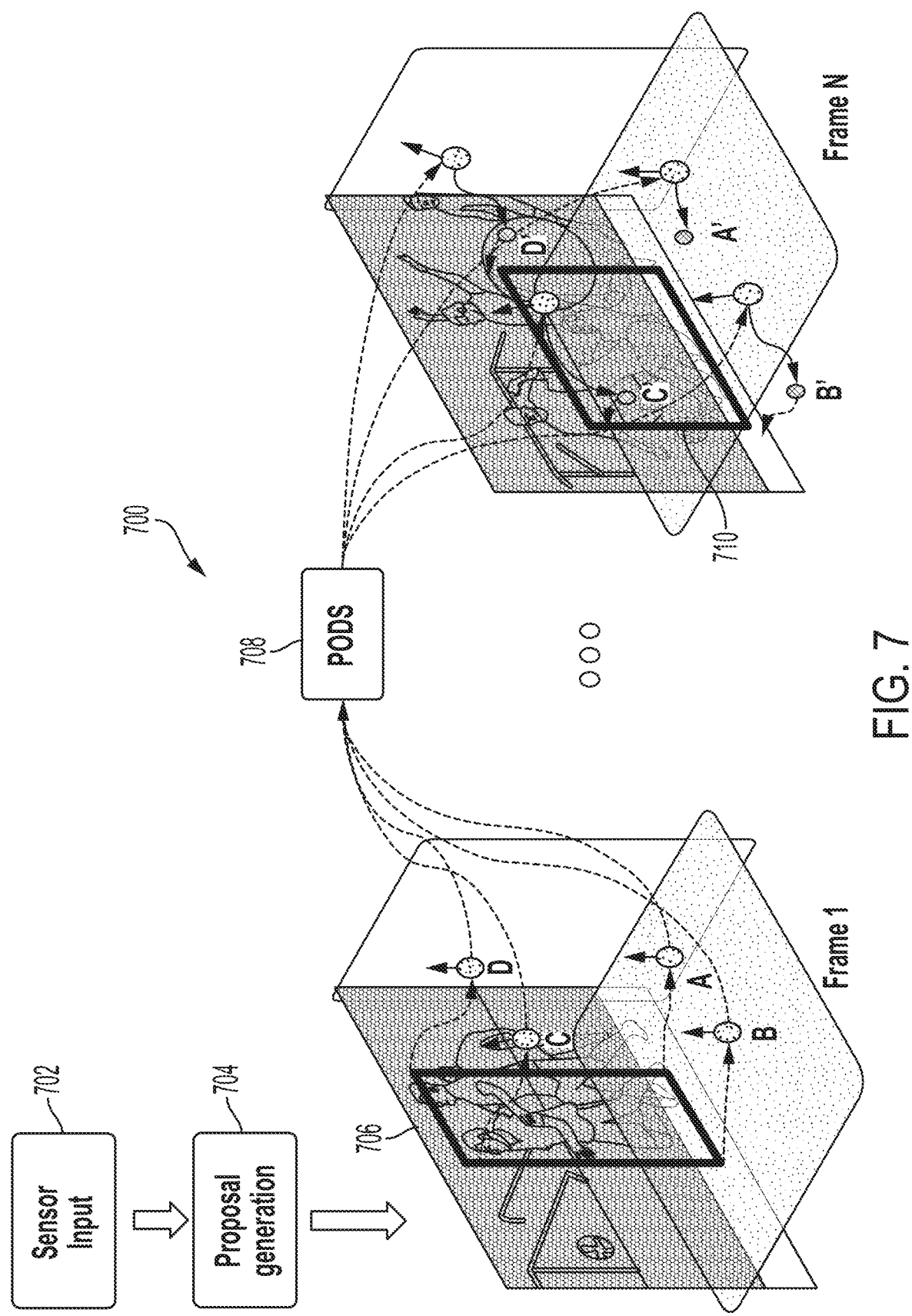
FIG. 7 depicts an example of predicting target proposals in accordance with one or more embodiments of the invention.

FIG. 7 depicts a sports scene where target proposals for tracking a person/object throughout an environment are generated in accordance with one or more embodiments of the invention. In some embodiments of the invention, the inputs may be sensor inputs 702 that are received by one or more sensors that are coupled to the system 700. The system 700 receives the sensor input 702 and generates the target proposals to perform object tracking. As shown on the display the target proposals for the athlete 706 include points A, B, C, and D. The direction vectors corresponding to these points are stored in the data structure 708 having a similar arrangement to that shown in FIG. 3. The future target proposals are determined using the data structure 708 and the target proposals for tracking the athlete 706 as the move throughout the sequence of frames is shown as A', B', C', and D'. The target proposals are then re-projected on the display 710 so that a user can identify the tracked region of the image. The tracking is continuously performed to update the target proposals.

Figure 8:
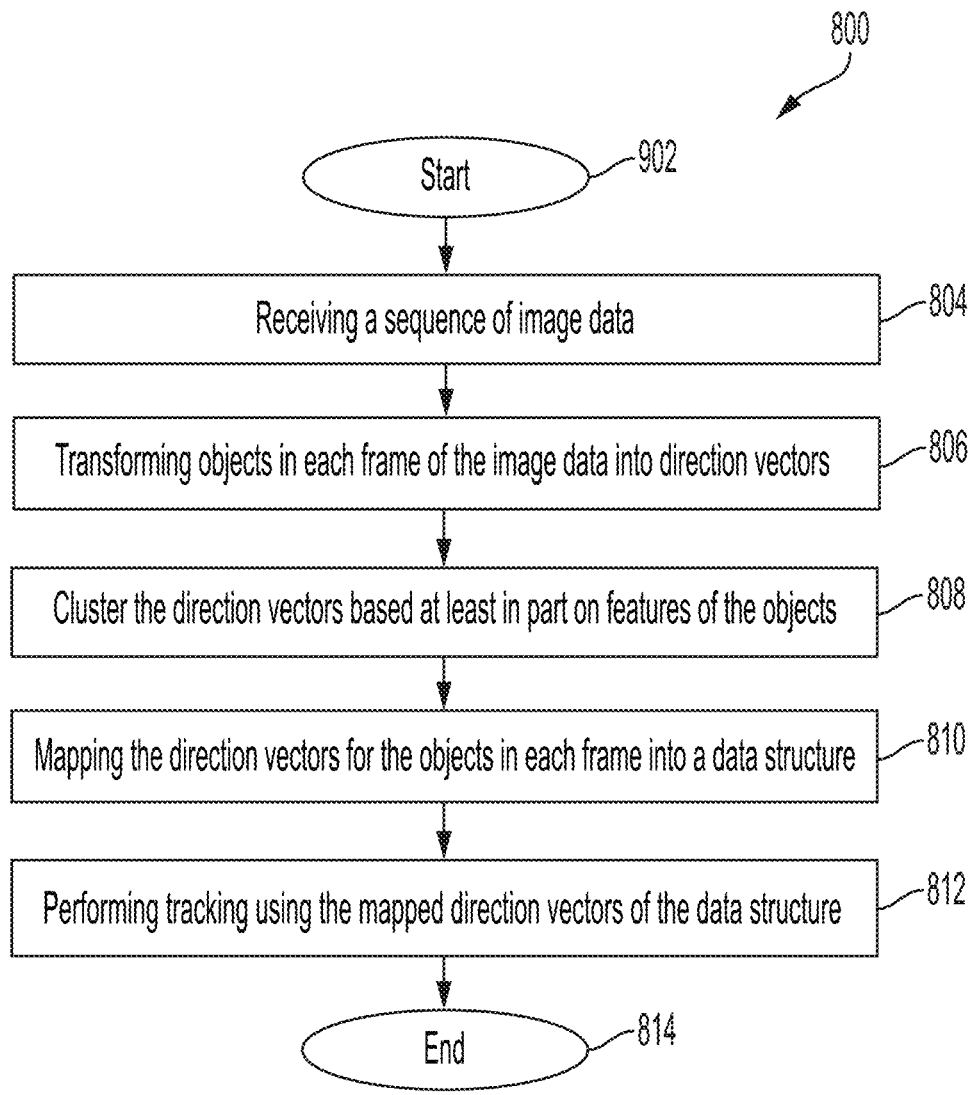
FIG. 8 depicts a method for performing memory-efficient video tracking in real-time using direction vectors in accordance with one or more embodiments.

FIG. 8 depicts a method 800 for memory-efficient object tracking in accordance with one or more embodiments. The method 800 can be performed by any of the systems 100 and 200. Block 802 provides for receiving input image data. The image data can include a single frame, video, or other types of digital data that provides a sequence of images. Block 804 transforms the objects in each frame of the image data into direction vectors (3D). The transformation can be achieved using known techniques. For example, feature detection can be performed to identify an object in the frame. These feature points of each object are tracked in each frame and are used to determine the inter-frame distance and orientation. As each frame of the image data is received, it is processed by the processing engine and the image is transformed into direction vectors.

Block 808 clusters the direction vectors based at least in part on features of the objects. Similar direction vectors that represent the same object can be clustered together. Block 810 maps the direction vectors into a position-orientation data structure (PODS) based at least in part on features. In one or more embodiments, the direction vectors that are associated with an object are clustered together and stored in a bin of the data structure. The direction vectors are clustered together based on the similarity of the position and orientation of the cluster of direction vectors. As each subsequent frame is processed and transformed into direction vectors, they are mapped into a location of the data structure based at least in part on the orientation and position of the object in the frame.

The data structure is arranged similar to that discussed with reference to FIG. 3, where the arrangement of the data structure allows for a quick search in the array to perform tracking and updates to locate missing/occluded image data. In one or more embodiments of the invention, the direction vectors or cluster of direction vectors can be stored and associated with temporal information and frame index information to facilitate the quick identification of missing data. This improves the search efficiency to locate image data.

Block 812 performs tracking the objects by updating the mapped direction vectors in the direction vectors. In one or more embodiments of the invention, the tracking of the object is performed by comparing the previous direction vectors corresponding to the object to the current direction vectors and taking an average. The updates are also stored in the data structure and are used to re-project the targets on a display. In addition, the image data/object can be tracked as input is obtained from a camera that is moving through various viewpoints, or image data obtained from multiple cameras that are positioned in different locations can be registered into a global frame of reference. The method 800 ends at block 814. It should be understood that additional steps or a different sequence of steps can be implemented in the method 800 and is not limited by the shown in FIG. 8.

Conventional techniques track each pixel in each and every frame which becomes very processing-intensive, the techniques described herein track clusters of direction vectors that represent objects of interest within the frames. This reduces the amount of data and the complexity of the processing to track an object through a moving scene. In addition, conventional techniques do not maintain references to objects that are no longer tracked or missing from a number of frames of a sequence. The techniques described herein maintains the data for the previous objects in the video sequence and can be located in the event a missing object has been determined. For example, unlike the sliding window based methods which can only utilize information within small temporal windows, the techniques described herein maintains information of all frames in PODS and successfully recognizes objects in dynamic scenes.

Technological contributions include improved processing which allows for increased ability to perform tracking in such applications as surveillance and monitoring. The technical effects and benefits include producing 3d reconstruction of the scene from a 2d video data, where information about the detected and tracked objects are combined from different camera viewpoints and multiple image frames into a 3d frame of reference. The technical effects and benefits include detecting and tracking multiple object entities in real-time video streams under moving camera scenarios.

Also, the technical effects and benefits include organizing image data into a highly memory-efficient data structure which enables tracking video content at interactive frame rates (20-25 fps). The technical effects and benefits include performing 3d reconstruction of the scene where tracked proposals from different camera viewpoints and image frames are mapped into a global 3d reference frame. The 3d reconstruction model enables the system to improve object tracking by combining information from multiple viewpoints. The technical effects and benefits include performing object tracking without AI-based inference/tracking which greatly improves processing time and reduces processing complexity.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
  receiving, by a processing engine, a sequence of image data;
  transforming objects in each frame of the sequence of the image data into direction vectors;
  clustering the direction vectors based at least in part on features of the objects;
  mapping the direction vectors for the objects in each frame into a position-orientation data structure; and
  performing tracking using the mapped direction vectors in the position-orientation data structure.

2. The computer-implemented method of claim 1 further comprising maintaining the direction vectors for each frame of the sequence of image data.

3. The computer-implemented method of claim 1, wherein clustering the direction vectors is based at least in part on smallest inter-frame distances and inter-frame orientation differences between the direction vectors of adjacent frames.

4. The computer-implemented method of claim 1, wherein the position-orientation data structure comprises a plurality of bins that are arranged according to orientation information and position information.

5. The computer-implemented method of claim 4, wherein a range corresponding to an orientation for each bin and position for each bin are configurable parameters.

6. The computer-implemented method of claim 1 further comprising storing the clustered direction vectors for each frame in the same location in the position-orientation data structure.

7. The computer-implemented method of claim 1, wherein the features of the objects include position information and orientation information.

8. The computer-implemented method of claim 1 further comprising:
    comparing corresponding direction vectors for a current frame with direction vectors of a previous frame;
    tracking the object based at least in part on the comparison; and
    re-projecting proposed targets for the object based on tracking the object.

9. The computer-implemented method of claim 1 further comprising:
    identifying a missing object in a current frame;
    performing a look-up operation in the position-orientation data structure based on the feature of the object of the current frame;
    retrieving missing object data from the position-orientation data structure; and
    displaying output data including the retrieved missing object data.

10. The computer-implemented method of claim 9, wherein the lookup operation is performed on a region of the position-orientation data structure that is less than all regions of the position-orientation data structure.

11. A system for performing object tracking, the system comprising:
    one or more processors; and
    at least one memory, the memory including instructions that, upon execution by at least one of the one or more processors, cause the system to perform a method for performing memory-efficient tracking, the method comprising:
        receiving a sequence of image data;
        transforming objects in each frame of the sequence of the image data into direction vectors;
        clustering the direction vectors based at least in part on features of the objects;
        mapping the direction vectors for the objects in each frame into a position-orientation data structure; and
        performing tracking using the mapped direction vectors in the position-orientation data structure.

12. The system of claim 11 further comprising storing the clustered direction vectors for each frame in the same location in the position-orientation data structure, wherein clustering the direction vectors is based at least in part on smallest inter-frame distances and inter-frame orientation differences between the direction vectors of adjacent frames.

13. The system of claim 11, wherein the position-orientation data structure comprises a plurality of bins that are arranged according to orientation information and position information.

14. The system of claim 11, wherein the features of the objects include position information and orientation information.

15. The system of claim 11 further comprising:
    comparing corresponding direction vectors for a current frame with direction vectors of a previous frame;
    tracking the object based at least in part on the comparison; and
    re-projecting proposed targets for the object based on tracking the object.

16. The system of claim 11 further comprising:
    identifying a missing object in a current frame;
    performing a look-up operation in the position-orientation data structure based on the feature of the object of the current frame, wherein the lookup operation is performed on a region of the position-orientation data structure that is less than all regions of the position-orientation data structure;
    retrieving missing object data from the position-orientation data structure; and
    displaying output data including the retrieved missing object data.

17. A computer program product for performing object tracking, the computer program product comprising a computer-readable storage medium having program instructions embodied therewith, the program instructions executable by a processor to cause the processor to:
    receive a sequence of image data;
    transform objects in each frame of the sequence of the image data into direction vectors;
    cluster the direction vectors based at least in part on features of the objects, wherein the features of the objects include position information and orientation information;
    map the direction vectors for the objects in each frame into a position-orientation data structure, wherein the position-orientation data structure comprises a plurality of bins that are arranged according to orientation information and position information; and
    perform tracking using the mapped direction vectors in the position-orientation data structure.

18. The computer program product for performing 17, wherein:
    clustering the direction vectors is based at least in part on smallest inter-frame distances and inter-frame orientation differences between the direction vectors of adjacent frames; and
    the program instructions are further executable by the processor to cause the processor to store the clustered direction vectors for each frame in the same location in the position-orientation data structure.

19. The computer program product for performing 17, wherein the program instructions are further executable by the processor to cause the processor to:
    compare corresponding direction vectors for a current frame with direction vectors of a previous frame;
    track the object based at least in part on the comparison; and
    re-project proposed targets for the object based on tracking the object.

20. The computer program product for performing 17, wherein the program instructions are further executable by the processor to cause the processor:
    identify a missing object in a current frame;
    perform a look-up operation in the position-orientation data structure based on the feature of the object of the current frame, wherein the lookup operation is performed on a region of the position-orientation data structure that is less than all regions of the position-orientation data structure;
    retrieve missing object data from the position-orientation data structure; and
    display output data including the retrieved missing object data.

* * * * *